United States Patent
Resch

(10) Patent No.: US 11,789,832 B1
(45) Date of Patent: Oct. 17, 2023

(54) RETRYING FAILED WRITE OPERATIONS IN A DISTRIBUTED STORAGE NETWORK

(71) Applicant: Pure Storage, Inc., Mountain View, CA (US)

(72) Inventor: Jason K. Resch, Chicago, IL (US)

(73) Assignee: PURE STORAGE, INC., Santa Clara, CA (US)

( * ) Notice: Subject to any disclaimer, the term of this patent is extended or adjusted under 35 U.S.C. 154(b) by 25 days.

(21) Appl. No.: 16/836,451

(22) Filed: Mar. 31, 2020

Related U.S. Application Data

(63) Continuation of application No. 15/840,070, filed on Dec. 13, 2017, now abandoned, which is a
(Continued)

(51) Int. Cl.
*G06F 12/00* (2006.01)
*G06F 13/00* (2006.01)
(Continued)

(52) U.S. Cl.
CPC .......... *G06F 11/2094* (2013.01); *G06F 3/064* (2013.01); *G06F 3/0604* (2013.01); *G06F 3/065* (2013.01); *G06F 3/067* (2013.01); *G06F 3/0619* (2013.01); *G06F 3/0631* (2013.01); *G06F 3/0653* (2013.01); *G06F 3/0665* (2013.01); *G06F 3/0689* (2013.01);
(Continued)

(58) Field of Classification Search
CPC .... G06F 3/0604; G06F 3/0619; G06F 3/0631; G06F 3/064; G06F 3/065; G06F 3/0653; G06F 3/0665; G06F 3/067; G06F 3/0689; G06F 9/5016; G06F 11/2094; G06F 11/1076; G06F 2201/82; G06F 2201/805; H04L 67/1097
USPC ........................................................ 711/114
See application file for complete search history.

(56) References Cited

U.S. PATENT DOCUMENTS 4,092,732 A 5/1978 Ouchi
5,454,101 A 9/1995 Mackay
(Continued)

OTHER PUBLICATIONS

Chung; An Automatic Data Segmentation Method for 3D Measured Data Points; National Taiwan University; pp. 1-8; 1998.
(Continued)

*Primary Examiner* — Sheng Jen Tsai
(74) *Attorney, Agent, or Firm* — GARLICK & MARKISON; Harry S. Tyson

(57) ABSTRACT

In various examples, a computing device of a dispersed storage network (DSN) receives a store data request including a data object. The computing device identifies a storage unit pool associated with the store data request. The storage unit pool includes a plurality of storage sets, each of the storage sets associated with a plurality of address ranges that are associated with a respective set of memories of the storage set. The computing device identifies a first set of memories of a first storage set of the storage unit pool, and issues a set of write slice requests to the first set of memories to initiate storage of encoded data slices produced from the data object. When an unfavorable storage condition is detected, the computing device identifies a second set of memories of the first storage set and facilitates storage of the data object in the second set of memories.

20 Claims, 6 Drawing Sheets

Related U.S. Application Data continuation-in-part of application No. 14/847,855, filed on Sep. 8, 2015, now Pat. No. 9,916,114.

(60) Provisional application No. 62/072,123, filed on Oct. 29, 2014.

(51) Int. Cl.

| | | |
|---|---|---|
| *G06F 11/20* | (2006.01) | |
| *G06F 3/06* | (2006.01) | |
| *G06F 11/10* | (2006.01) | |
| *G06F 9/50* | (2006.01) | |
| *H04L 67/1097* | (2022.01) | |

(52) U.S. Cl.
CPC ........ *G06F 9/5016* (2013.01); *G06F 11/1076* (2013.01); *H04L 67/1097* (2013.01); *G06F 2201/805* (2013.01); *G06F 2201/82* (2013.01)

(56) References Cited

U.S. PATENT DOCUMENTS

| | | | |
|---|---|---|---|
| 5,485,474 A | 1/1996 | Rabin | |
| 5,774,643 A | 6/1998 | Lubbers | |
| 5,802,364 A | 9/1998 | Senator | |
| 5,809,285 A | 9/1998 | Hilland | |
| 5,890,156 A | 3/1999 | Rekieta | |
| 5,987,622 A * | 11/1999 | Lo Verso | G06F 11/1076 |
| | | | 714/6.1 |
| 5,991,414 A | 11/1999 | Garay | |
| 6,012,159 A | 1/2000 | Fischer | |
| 6,058,454 A | 5/2000 | Gerlach | |
| 6,128,277 A | 10/2000 | Bruck | |
| 6,175,571 B1 | 1/2001 | Haddock | |
| 6,192,472 B1 | 2/2001 | Garay | |
| 6,256,688 B1 | 7/2001 | Suetaka | |
| 6,272,658 B1 | 8/2001 | Steele | |
| 6,301,604 B1 | 10/2001 | Nojima | |
| 6,356,949 B1 | 3/2002 | Katsandres | |
| 6,366,995 B1 | 4/2002 | Nikolaevich | |
| 6,374,336 B1 | 4/2002 | Peters | |
| 6,415,373 B1 | 7/2002 | Peters | |
| 6,418,539 B1 | 7/2002 | Walker | |
| 6,449,688 B1 | 9/2002 | Peters | |
| 6,567,948 B2 | 5/2003 | Steele | |
| 6,571,282 B1 | 5/2003 | Bowman-Amuah | |
| 6,609,223 B1 | 8/2003 | Wolfgang | |
| 6,700,809 B1 * | 3/2004 | Ng | G11C 15/00 |
| | | | 365/236 |
| 6,718,361 B1 * | 4/2004 | Basani | H04L 67/1095 |
| | | | 707/999.01 |
| 6,760,808 B2 * | 7/2004 | Peters | H04N 21/442 |
| 6,785,768 B2 | 8/2004 | Peters | |
| 6,785,783 B2 | 8/2004 | Buckland | |
| 6,826,711 B2 | 11/2004 | Moulton | |
| 6,879,596 B1 | 4/2005 | Dooply | |
| 7,003,688 B1 | 2/2006 | Pittelkow | |
| 7,024,451 B2 | 4/2006 | Jorgenson | |
| 7,024,609 B2 | 4/2006 | Wolfgang | |
| 7,080,101 B1 * | 7/2006 | Watson | G06F 16/2282 |
| 7,103,824 B2 | 9/2006 | Halford | |
| 7,103,915 B2 | 9/2006 | Redlich | |
| 7,111,115 B2 | 9/2006 | Peters | |
| 7,133,600 B1 * | 11/2006 | Boyle | H04N 5/76 |
| | | | 386/265 |
| 7,140,044 B2 | 11/2006 | Redlich | |
| 7,146,644 B2 | 12/2006 | Redlich | |
| 7,171,493 B2 | 1/2007 | Shu | |
| 7,222,133 B1 | 5/2007 | Raipurkar | |
| 7,240,236 B2 | 7/2007 | Cutts | |
| 7,266,556 B1 * | 9/2007 | Coates | G06F 11/2094 |
| 7,272,613 B2 | 9/2007 | Sim | |
| 7,636,724 B2 | 12/2009 | De la Torre | |
| 8,924,681 B1 * | 12/2014 | Throop | G06F 3/0671 |
| | | | 711/170 |
| 8,972,694 B1 * | 3/2015 | Dolan | G06F 3/0685 |
| | | | 711/172 |
| 9,072,169 B1 * | 6/2015 | Cobler | G01J 3/0291 |
| 9,244,152 B1 * | 1/2016 | Thiagarajan | G01S 5/10 |
| 9,727,266 B2 * | 8/2017 | Resch | G06F 3/0625 |
| 9,841,925 B2 * | 12/2017 | Khadiwala | G06F 3/0659 |
| 9,916,114 B2 * | 3/2018 | Resch | G06F 3/0619 |
| 9,921,907 B2 * | 3/2018 | Volvovski | H04L 67/1097 |
| 2002/0062422 A1 | 5/2002 | Butterworth | |
| 2002/0166079 A1 | 11/2002 | Ulrich | |
| 2003/0018927 A1 | 1/2003 | Gadir | |
| 2003/0037261 A1 | 2/2003 | Meffert | |
| 2003/0065617 A1 | 4/2003 | Watkins | |
| 2003/0084020 A1 * | 5/2003 | Shu | G06F 11/1076 |
| 2003/0163718 A1 * | 8/2003 | Johnson | G06F 21/79 |
| | | | 713/193 |
| 2004/0024963 A1 | 2/2004 | Talagala | |
| 2004/0057316 A1 * | 3/2004 | Kozakai | G06F 12/0246 |
| | | | 711/E12.008 |
| 2004/0122917 A1 * | 6/2004 | Menon | H04L 67/1002 |
| | | | 709/219 |
| 2004/0210729 A1 * | 10/2004 | Horii | G11C 7/1042 |
| | | | 711/156 |
| 2004/0215998 A1 | 10/2004 | Buxton | |
| 2004/0228493 A1 | 11/2004 | Ma | |
| 2005/0015539 A1 * | 1/2005 | Horii | G11C 7/1042 |
| | | | 711/168 |
| 2005/0100022 A1 * | 5/2005 | Ramprashad | H04L 47/32 |
| | | | 370/395.42 |
| 2005/0114594 A1 | 5/2005 | Corbett | |
| 2005/0125593 A1 | 6/2005 | Karpoff | |
| 2005/0131993 A1 | 6/2005 | Fatula, Jr. | |
| 2005/0132070 A1 | 6/2005 | Redlich | |
| 2005/0144382 A1 | 6/2005 | Schmisseur | |
| 2005/0193084 A1 * | 9/2005 | Todd | G06F 3/067 |
| | | | 709/214 |
| 2005/0229069 A1 | 10/2005 | Hassner | |
| 2006/0036669 A1 * | 2/2006 | Radulescu | 709/200 |
| 2006/0047907 A1 | 3/2006 | Shiga | |
| 2006/0136448 A1 | 6/2006 | Cialini | |
| 2006/0156059 A1 | 7/2006 | Kitamura | |
| 2006/0224603 A1 * | 10/2006 | Correll | G06F 16/283 |
| 2007/0079081 A1 | 4/2007 | Gladwin | |
| 2007/0079082 A1 | 4/2007 | Gladwin | |
| 2007/0079083 A1 | 4/2007 | Gladwin | |
| 2007/0088970 A1 | 4/2007 | Buxton | |
| 2007/0174192 A1 * | 7/2007 | Gladwin | G06F 21/6227 |
| | | | 705/40 |
| 2007/0214285 A1 | 9/2007 | Au | |
| 2007/0234110 A1 | 10/2007 | Soran | |
| 2007/0283167 A1 | 12/2007 | Venters, III | |
| 2008/0243783 A1 * | 10/2008 | Santi | G06Q 30/0254 |
| 2009/0089149 A1 * | 4/2009 | Lerner | G06Q 10/047 |
| | | | 705/7.34 |
| 2009/0094251 A1 * | 4/2009 | Gladwin | G06F 16/10 |
| 2009/0094318 A1 * | 4/2009 | Gladwin | H04L 67/1002 |
| | | | 709/203 |
| 2010/0023524 A1 * | 1/2010 | Gladwin | G06F 3/0659 |
| | | | 707/E17.032 |
| 2010/0106907 A1 * | 4/2010 | Noguchi | G06F 11/2082 |
| | | | 707/E17.014 |
| 2011/0066801 A1 * | 3/2011 | Sato | G06F 3/0637 |
| | | | 711/E12.001 |
| 2011/0072321 A1 * | 3/2011 | Dhuse | G06F 11/1076 |
| | | | 714/55 |
| 2012/0117351 A1 * | 5/2012 | Motwani | H04L 63/0823 |
| | | | 711/165 |
| 2012/0131584 A1 * | 5/2012 | Raevsky | G06F 8/45 |
| | | | 718/102 |
| 2012/0167108 A1 * | 6/2012 | Bowers | G06F 9/5072 |
| | | | 718/103 |
| 2013/0275656 A1 * | 10/2013 | Talagala | G06F 12/0246 |
| | | | 711/103 |
| 2013/0326264 A1 * | 12/2013 | Resch | G06F 11/1092 |
| | | | 714/6.2 |
| 2014/0075112 A1 * | 3/2014 | Baptist | H04L 67/1097 |
| | | | 711/114 |

(56) References Cited

U.S. PATENT DOCUMENTS

| | | | | |
|---|---|---|---|---|
| 2014/0177476 | A1* | 6/2014 | Perrett | H04L 41/145 370/255 |
| 2014/0223095 | A1* | 8/2014 | Storm | G06F 3/0619 711/114 |
| 2014/0304560 | A1* | 10/2014 | Narasimha | G06F 13/1657 714/704 |
| 2015/0067421 | A1* | 3/2015 | Baptist | G06F 16/13 714/723 |
| 2015/0378616 | A1* | 12/2015 | Khadiwala | G06F 3/0659 711/114 |
| 2015/0378626 | A1* | 12/2015 | Motwani | G06F 3/067 711/114 |
| 2015/0378822 | A1* | 12/2015 | Grube | G06F 3/061 714/763 |
| 2015/0381730 | A1* | 12/2015 | Resch | G06F 3/0623 709/225 |
| 2015/0381731 | A1* | 12/2015 | Grube | H04L 67/325 709/224 |
| 2016/0179618 | A1* | 6/2016 | Resch | G06F 21/80 714/764 |
| 2016/0188253 | A1* | 6/2016 | Resch | G06F 3/0647 711/172 |
| 2016/0226522 | A1* | 8/2016 | Resch | H03M 13/3761 |
| 2016/0255150 | A1* | 9/2016 | Dhuse | H04L 67/1097 709/213 |
| 2016/0292254 | A1* | 10/2016 | Dhuse | G06F 16/2272 |
| 2016/0294949 | A1* | 10/2016 | Motwani | G06F 3/0632 |
| 2016/0306699 | A1* | 10/2016 | Resch | G06F 3/0619 |
| 2016/0342475 | A1* | 11/2016 | Dhuse | G06F 3/0619 |
| 2016/0378350 | A1* | 12/2016 | Motwani | H04N 21/274 711/154 |
| 2017/0091035 | A1* | 3/2017 | Kazi | G06F 3/0659 |
| 2017/0147428 | A1* | 5/2017 | Volvovski | G06F 3/067 |
| 2017/0168720 | A1* | 6/2017 | Kazi | G06F 11/1076 |
| 2017/0168749 | A1* | 6/2017 | Grube | G06F 3/061 |
| 2017/0177228 | A1* | 6/2017 | Baptist | H04N 21/2181 |
| 2017/0315871 | A1* | 11/2017 | Gladwin | G06F 11/1076 |
| 2018/0004604 | A1* | 1/2018 | Khadiwala | G06F 16/10 |
| 2018/0074744 | A1* | 3/2018 | Kazi | G06F 3/0635 |
| 2018/0074879 | A1* | 3/2018 | Khadiwala | G06F 11/1092 |
| 2018/0081586 | A1* | 3/2018 | Kazi | G06F 3/0653 |
| 2018/0101457 | A1* | 4/2018 | Resch | G06F 3/0631 |
| 2019/0034276 | A1* | 1/2019 | Mark | G06F 3/064 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Croup; RFC 4519; Jun. 2006; pp. 1-33.

Sermersheim; Lightweight Directory Access Protocol (LDAP): The Protocol; IETF Network Working Group; RFC 1511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

* cited by examiner

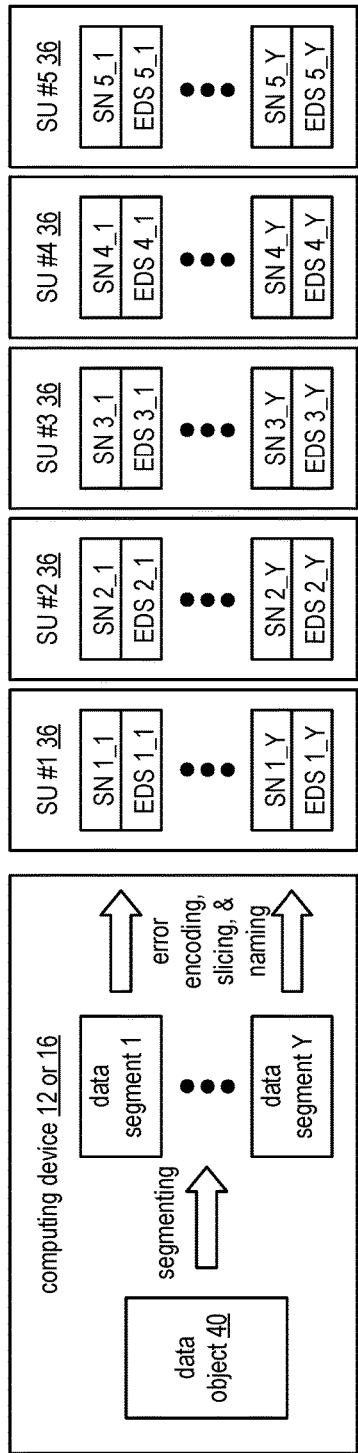

RETRYING FAILED WRITE OPERATIONS IN A DISTRIBUTED STORAGE NETWORK

CROSS-REFERENCE TO RELATED APPLICATIONS

The present U.S. Utility Patent Applications claims priority pursuant to 35 U.S.C. § 120 as a continuation of U.S. Utility application Ser. No. 15/840,070, entitled "RETRYING FAILED WRITE OPERATIONS IN A DISPERSED STORAGE NETWORK", filed Dec. 13, 2017, which is a continuation-in-part of U.S. Utility application Ser. No. 14/847,855, entitled "DETERMINISTICALLY SHARING A PLURALITY OF PROCESSING RESOURCES", filed Sep. 8, 2015, now U.S. Pat. No. 9,916,114, issued on Mar. 13, 2018, which claims priority pursuant to 35 U.S.C. § 119(e) to U.S. Provisional Application No. 62/072,123, entitled "ASSIGNING TASK EXECUTION RESOURCES IN A DISPERSED STORAGE NETWORK", filed Oct. 29, 2014, all of which are hereby incorporated herein by reference in their entirety and made part of the present U.S. Utility Patent Application for all purposes.

BACKGROUND

This invention relates generally to computer networks, and more specifically, to selection of storage resources in a dispersed storage network.

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on a remote storage system. The remote storage system may include a RAID (redundant array of independent disks) system and/or a dispersed storage system that uses an error correction scheme to encode data for storage.

In a RAID system, a RAID controller adds parity data to the original data before storing it across an array of disks. The parity data is calculated from the original data such that the failure of a single disk typically will not result in the loss of the original data. While RAID systems can address certain memory device failures, these systems may suffer from effectiveness, efficiency and security issues. For instance, as more disks are added to the array, the probability of a disk failure rises, which may increase maintenance costs. When a disk fails, for example, it needs to be manually replaced before another disk(s) fails and the data stored in the RAID system is lost. To reduce the risk of data loss, data on a RAID device is often copied to one or more other RAID devices. While this may reduce the possibility of data loss, it also raises security issues since multiple copies of data may be available, thereby increasing the chances of unauthorized access. In addition, co-location of some RAID devices may result in a risk of a complete data loss in the event of a natural disaster, fire, power surge/outage, etc.

SUMMARY

According to embodiments of the present disclosure, novel methods are presented for use in a dispersed storage network (DSN) to select storage resources for retrying failed write operations. In various examples, a store data request is received, the store data request including a data object. A storage unit pool associated with the store data request is identified, the storage unit pool including a plurality of storage sets. Each of the storage sets is associated, for example, with a plurality of address ranges that are associated with a respective set of memories of the storage set. A first set of memories of a first storage set of the storage unit pool is identified, and a set of write slice requests is issued to the first set of memories to initiate storage of encoded data slices produced from the data object. When an unfavorable storage condition is detected, a second set of memories of the first storage set is identified. The first set of memories and the second set of memories can be located, at least in part, in common storage units of the first storage set. The data object is then stored in the second set of memories.

BRIEF DESCRIPTION OF THE DRAWINGS

FIG. 3 is a schematic block diagram of an example of dispersed storage error encoding of data in accordance with the present disclosure;

FIG. 4 is a schematic block diagram of a generic example of an error encoding function in accordance with the present disclosure;

FIG. 5 is a schematic block diagram of a specific example of an error encoding function in accordance with the present disclosure;

FIG. 6 is a schematic block diagram of an example of slice naming information for an encoded data slice (EDS) in accordance with the present disclosure;

DETAILED DESCRIPTION

Figure 1:
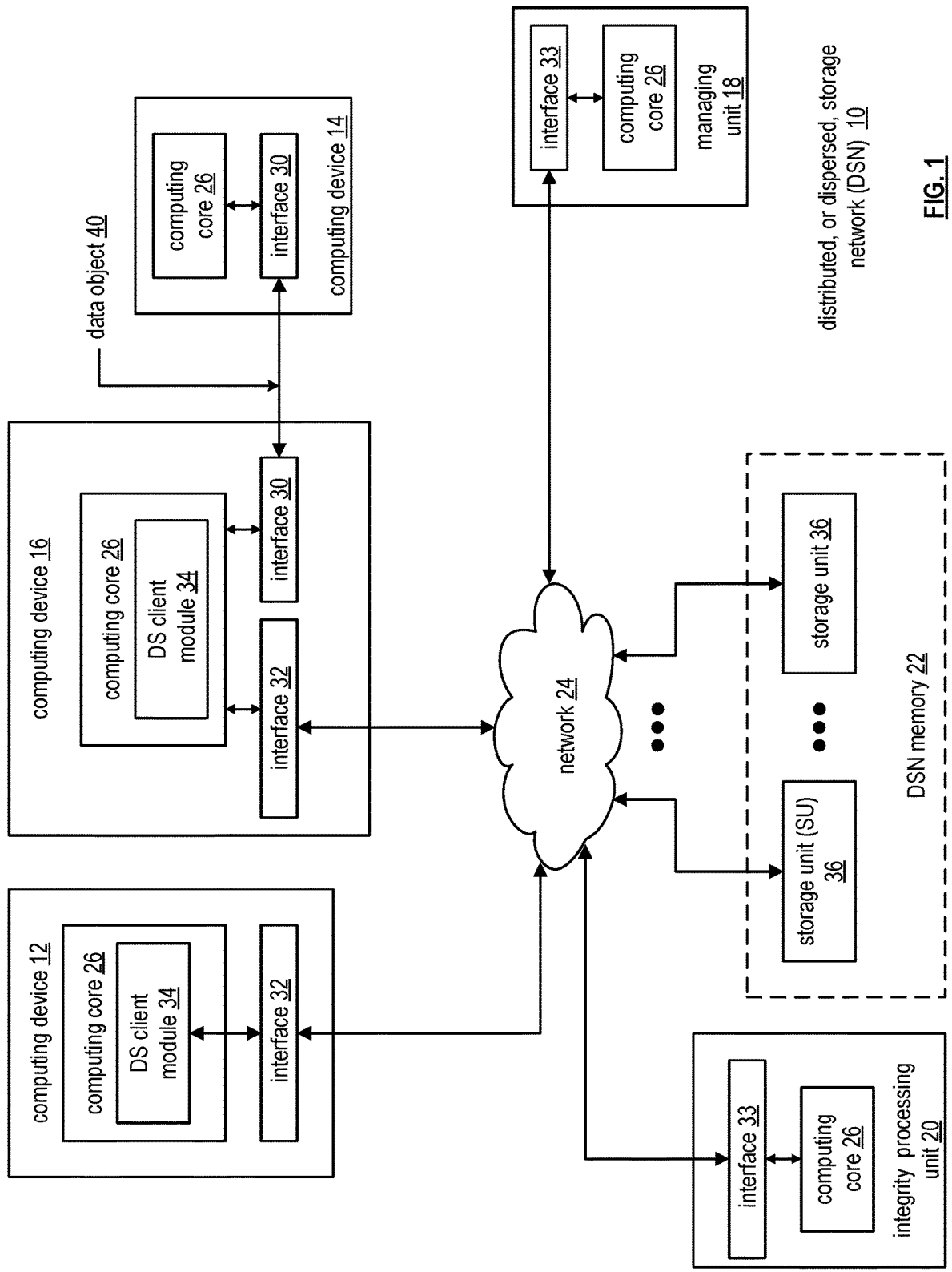
FIG. 1 is a schematic block diagram of an embodiment of a dispersed or distributed storage network (DSN) in accordance with the present disclosure.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
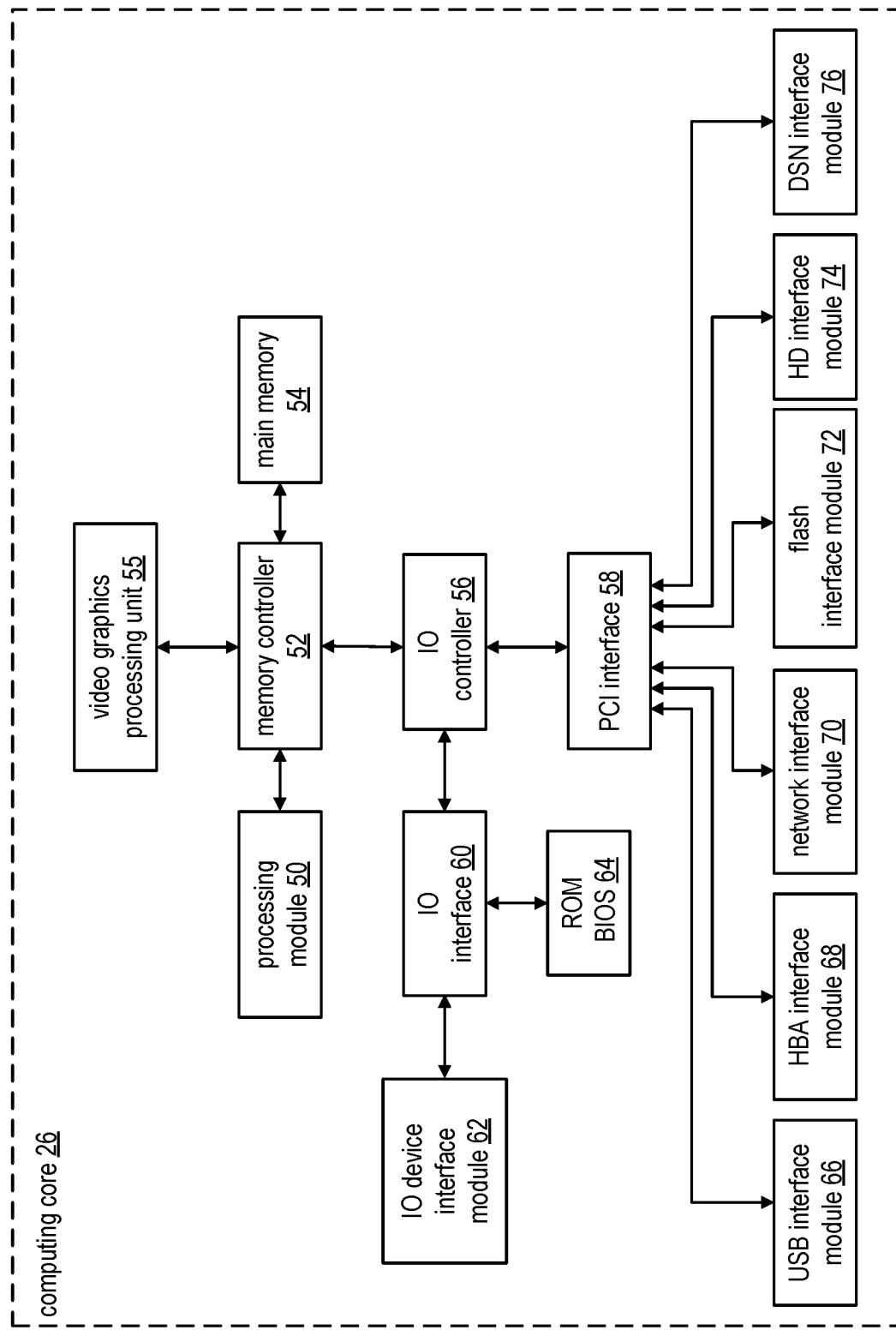
FIG. 2 is a schematic block diagram of an embodiment of a computing core in accordance with the present disclosure.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more than or less than eight storage units 36. Further note that each storage unit 36 includes a computing core (as shown in FIG. 2, or components thereof) and a plurality of memory devices for storing dispersed storage (DS) error encoded data.

Each of the storage units 36 is operable to store DS error encoded data and/or to execute (e.g., in a distributed manner) maintenance tasks and/or data-related tasks. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, maintenance tasks (e.g., rebuilding of data slices, updating hardware, rebooting software, restarting a particular software process, performing an upgrade, installing a software patch, loading a new software revision, performing an off-line test, prioritizing tasks associated with an online test, etc.), etc.

Each of the computing devices 12-16, the managing unit 18, integrity processing unit 20 and (in various embodiments) the storage units 36 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data object 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate per-access billing information. In another instance, the managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation/access requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10. Examples of dynamic resource selection for data access operations are discussed in greater detail with reference to FIGS. 9-11.

To support data storage integrity verification within the DSN 10, the integrity processing unit 20 (and/or other devices in the DSN 10) may perform rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. Retrieved encoded slices are checked for errors due to data corruption, outdated versioning, etc. If a slice includes an error, it is flagged as a 'bad' or 'corrupt' slice. Encoded data slices that are not received and/or not listed may be flagged as missing slices. Bad and/or missing slices may be subsequently rebuilt using other retrieved encoded data slices that are deemed to be good slices in order to produce rebuilt slices. A multi-stage decoding process may be employed in certain circumstances to recover data even when the number of valid encoded data slices of a set of encoded data slices is less than a relevant decode threshold number. The rebuilt slices may then be written to DSN memory 22. Note that the integrity processing unit 20 may be a separate unit as shown, included in DSN memory 22, included in the computing device 16, and/or distributed among the storage units 36.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of five, a decode threshold of three, a read threshold of four, and a write threshold of four. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number. In the illustrated example, the value X11=aD1+bD5+cD9, X12=aD2+bD6+cD10, . . . X53=mD3+nD7+oD11, and X54=mD4+nD8+oD12.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as at least part of a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
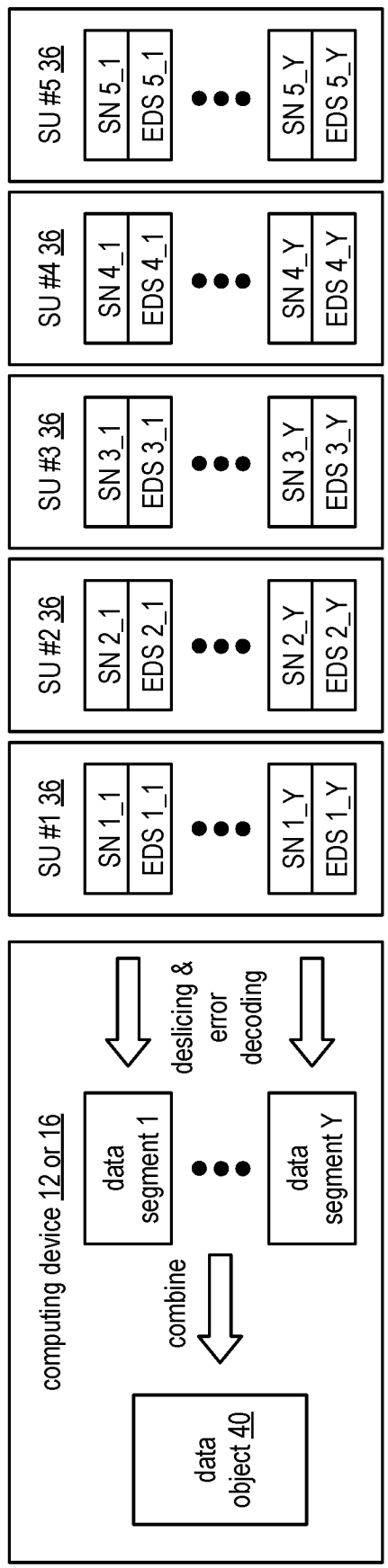
FIG. 7 is a schematic block diagram of an example of dispersed storage error decoding of data in accordance with the present disclosure.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
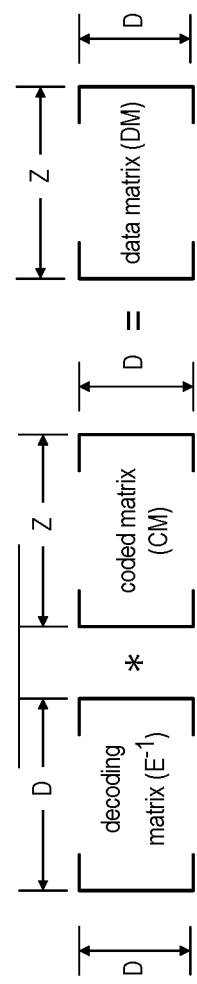
FIG. 8 is a schematic block diagram of a generic example of an error decoding function in accordance with the present disclosure.

In order to recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In a dispersed storage network, storage units and memory devices may occasionally be unavailable for processing data storage requests (e.g., write slice requests). Such unavailability may affect only a certain part of a DSN address range or sub-address range. In the novel methodologies and devices described more fully below in conjunction with FIGS. 9 and 10, a failed storage request due to such unavailability is resolved by generating a new DSN address (e.g., an address associated with differing or known healthy storage units/memory devices supporting a write threshold number), and retrying the storage request using the new DSN address.

Briefly, in an example of operation, a storage unit pool includes a storage set having 48 storage units, and pillar width of 12. In this example, the first one-quarter of an address range associated with the storage unit pool covers a set of storage units 0-11, the second quarter of the address range covers a set of storage units 12-23, the next quarter of the address range covers a set of storage units 24-35, and the final quarter of the address range covers a set of storage units 36-47. If a write slice request(s) is received having a DSN address processed by the set of storage units 24-35, and fewer than a write threshold number of storage units of the set are available, a second DSN address is determined for use in retrying the write slice request(s). The second DSN address may specifically avoid the set of storage units 24-35 (e.g., the second DSN address may cover storage units 36-47). In other examples, the second DSN address may cover differing memory devices of the set of storage units 24-35.

Figure 9:
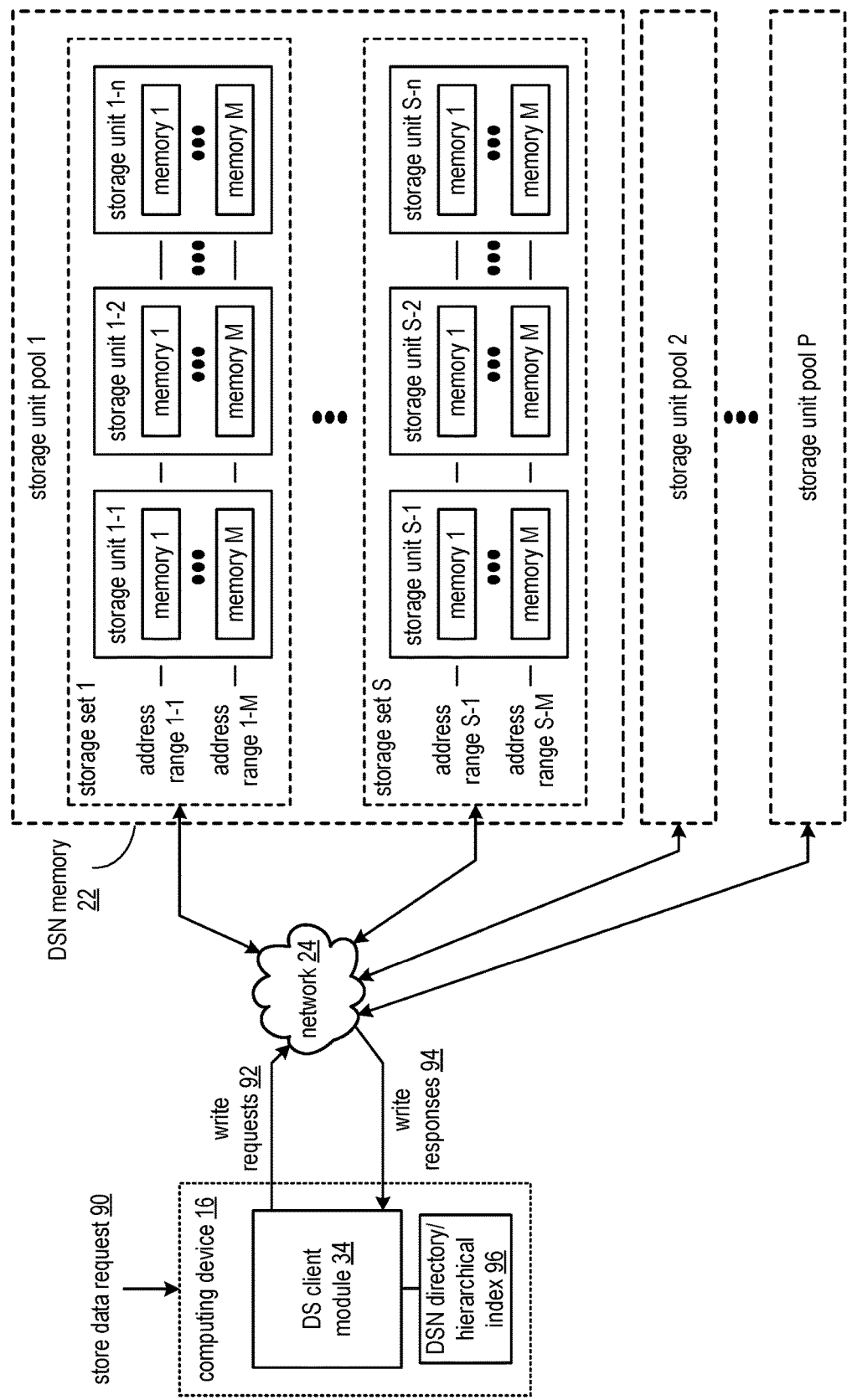
FIG. 9 is a schematic block diagram of an example of a DSN performing data storage in accordance with an embodiment of the present disclosure.

Referring now to FIG. 9, a schematic block diagram of a dispersed storage network (DSN) performing data storage in accordance with an embodiment of the present disclosure is illustrated. The DSN of this example includes the computing device 16 of FIG. 1, the network 24 of FIG. 1, and the distributed storage network (DSN) memory 22 of FIG. 1. The computing device 16 includes the DS client module 34 of FIG. 1. The DSN memory 22 includes a plurality of storage unit pools 1-P. Each storage unit pool includes one or more storage sets 1-S. Each storage set includes a set of storage units 1-$n$, and each storage unit includes a plurality of memories 1-M. Each storage unit may be implemented utilizing the storage unit 36 of FIG. 1, and further include a DS client module 34 and a processing module (not separately illustrated). Each memory of each storage set is associated with a DSN address range 1-M (e.g., range of slice names). The storage units of a storage set/storage unit pool may be located at a same physical location (site) or located at multiple physical locations without departing from the technology as described herein.

In general, DSN memory 22 stores a plurality of dispersed storage (DS) error encoded data. The DS error encoded data may be encoded in accordance with one or more examples described with reference to FIGS. 3-6, and organized (for example) in slice groupings or pillar groups. The data that is encoded into the DS error encoded data may be of any size and/or of any content. For example, the data may be one or more digital books, a copy of a company's emails, a large-scale Internet search, a video security file, one or more entertainment video files (e.g., television programs, movies, etc.), data files, and/or indexing and key information for use in dispersed storage operations.

In an example of operation of storing data in DSN memory 22, the computing device 16 receives a store data request 90. The store data request 90 includes one or more of a data object, a data object name, and a requester identity. Having received the store data request 90, the DS client module 34 identifies a storage unit pool associated with the store data request. In an example, identifying a storage unit pool includes at least one of performing a vault lookup based on the requester identity, performing a random selection, selecting based on available storage set storage capacity, and selecting based on storage set performance levels.

Having identified the storage unit pool, the DS client module 34 generates a DSN address, where the DSN address falls within an address range (or a sub-address range of an address range) associated with a plurality of storage sets, where each storage set is associated with a plurality of address ranges, and where each address range is associated with a set of memories. For example, the DS client module 34 generates the DSN address based on a random number to produce an available DSN address within a plurality of address ranges of the identified storage unit pool. As another example, the DS client module 34 generates the DSN address based on memory attributes such as performance and available capacity.

Having generated the DSN address, the DS client module 34 initiates storage of the data object at the DSN address. For example, the DS client module 34 dispersed storage error encodes the data object (or a segment thereof) to produce a plurality of sets of encoded data slices (each set of which may include an information dispersal algorithm (IDA) width number of encoded data slices) and issues, via the network 24, one or more sets of write slice requests as write requests 92 that includes the plurality of sets of encoded data slices to be stored in the storage units associated with the DSN address. Having issued the write requests 92, the DS client module 34 receives write responses 94 from at least some of the storage units.

When an unfavorable condition is detected with regards to storage of the data object at the DSN address (e.g., less than a write threshold number of favorable write responses have been received), the DS client module 34 generates another DSN address, where the other DSN address is associated with another set of memories (e.g., of the same set of storage units or from another set of storage units).

Having generated the other DSN address, the DS client module 34 facilitates storage of the data object at the other DSN address. For example, the DS client module 34 resends the one or more sets of write slice requests 92 to a set of storage units associated with the other set of memories. Having resent the one or more sets of write slice requests 92, the DS client module 34 may also update a DSN directory/hierarchical index 96 (e.g., maintained by the computing device 16 and/or other DSN devices) or equivalent to associate the data object name and the other DSN address.

In further examples, after another unfavorable condition is detected, the DS client module 34 may generate a third (or more) DSN address for use in storage of the data object. In addition, when a write slice request fails due to an unavailable or impaired memory device, the associated storage unit(s) may return an error response that includes a list of address ranges of the storage unit associated with available/unavailable memory devices. The DS client module 34 may then utilize this information to generate a DSN address that falls within an address range including available memory devices. This embodiment may be useful, for example, where only a single set of storage units is available (e.g., a storage set of 12 storage units and an IDA width of 12).

Figure 10:
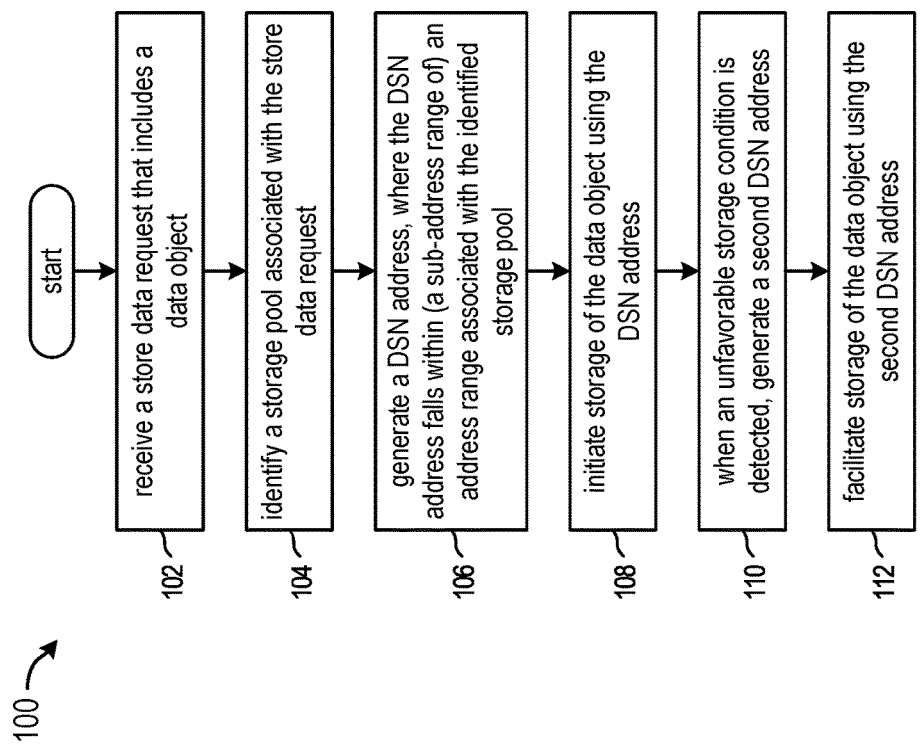
FIG. 10 is a flow diagram illustrating an example of storing data in accordance with the present disclosure.

FIG. 10 is a flowchart 100 illustrating an example of storing data. The method begins or continues at step 102 where a processing module (e.g., of a distributed storage (DS) client module 34) receives a store data request that includes a data object. Receiving the store data request may further include receiving a requester identity and a data object name. The method continues at step 104 where the processing module identifies a storage unit pool associated with the store data request. Identifying a storage unit pool may include one or more of interpreting system registry information, interpreting a vault entry associated with the requester identifier, performing a random selection, selecting based on performance, and selecting based on available storage capacity.

The method continues at step 106 where the processing module generates a dispersed storage network (DSN) address, where the DSN address falls within an address range (or a sub-address range of an address range) associated with the identified storage unit pool. Generating a DSN address may include at least one of generating a random address within the address range of the identified storage unit pool (e.g., to include a vault identifier and a random object number), selecting a next available DSN address, and selecting a DSN address associated with a set of memories associated with favorable performance and storage capacity.

The method continues at step 108 where the processing module initiates storage of the data object using the DSN address. In various examples, the processing module dispersed storage error encodes the data object to produce a plurality of sets of encoded data slices, generates a plurality of sets of slice names that includes the DSN address (e.g., includes a slice index, a segment number, the vault identifier, and the random object number), generates one or more sets of write slice requests that includes the plurality of sets of encoded data slices and the plurality of sets of slice names, and sends the one or more sets of write slice requests to a storage set associated with the DSN address.

When an unfavorable storage condition is detected, the method continues at step 110 where the processing module generates a second DSN address. For example, the processing module detects the unfavorable storage condition (e.g., a time frame expires without receiving a write threshold number of favorable write slice responses), identifies a set of memories associated with the DSN address, selects a different set of memories associated with favorable performance and available capacity, and generates a DSN address associated with the other set of memories as the second DSN address.

The method continues at step 112 where the processing module facilitates storage of the data object using the second DSN address. For example, the processing module issues write slice requests to storage units associated with the other set of memories, where the write slice requests include the plurality of sets of encoded data slices. When receiving favorable write slice responses, the processing module associates the data object name and the second DSN address. For example, the processing module updates a DSN directory. As another example, the processing module updates a dispersed hierarchical index.

The methods described above in conjunction with the computing device 16 and storage units 36 can alternatively be performed by other modules (e.g., DS client modules 34) of a dispersed storage network or by other devices (e.g., managing unit 18 or integrity processing unit 20). Any combination of a first module, a second module, a third module, a fourth module, etc. of the computing devices and the storage units may perform the method described above. In addition, at least one memory section (e.g., a first memory section, a second memory section, a third memory section, a fourth memory section, a fifth memory section, a sixth memory section, etc. of a non-transitory computer readable storage medium) that stores operational instructions/program instructions can, when executed by one or more processing modules of one or more computing devices and/or by the storage units of the dispersed storage network (DSN), cause the one or more computing devices and/or the storage units to perform any or all of the method steps described above.

As may be used herein, the terms "substantially" and "approximately" provide an industry-accepted tolerance for its corresponding term and/or relativity between items. Such an industry-accepted tolerance ranges from less than one percent to fifty percent. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagrams, can be implemented by special purpose hardware-based systems that perform the specified functions or acts or carry out combinations of special purpose hardware and computer instructions.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be one or more tangible devices that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of a storage network, the method comprises:
   receiving a store data request, the store data request including a data object;
   identifying a storage unit pool associated with the store data request, the storage unit pool including a plurality of storage sets;
   identifying a first set of memory devices of a storage set of the plurality of storage sets, wherein the storage set includes a plurality of storage units;
   issuing a set of write slice requests to the first set of memory devices of the storage set, the set of write slice requests including a set of encoded data slices produced from the data object;
   detecting an unfavorable storage condition in response to the set of write slice requests, including receiving an error response from the storage set that includes an indication that at least one memory device of the first set of memory devices is unavailable for use in storing the data object;
   in response to detecting the unfavorable storage condition, identifying a second set of memory devices of the set of storage units of the storage set, wherein at least one memory device of the first set of memory devices and at least one memory device of the second set of memory devices are located in the same storage unit of the storage set; and
   facilitating storage of the data object in the second set of memory devices.

2. The method of claim 1, wherein detecting the unfavorable storage condition further includes receiving, from the storage unit pool, less than a write threshold number of favorable write slice responses to the set of write slice requests prior to expiration of a predetermined time frame.

3. The method of claim 1, wherein detecting the unfavorable storage condition includes receiving an error response that includes an indication of one or more address ranges of a storage unit that are unavailable for use in storing the data object.

4. The method of claim 1 further comprises:
generating a first address that falls within an address range associated with the first set of memory devices of the storage set, wherein the set of write slice requests is issued in accordance with the first address.

5. The method of claim 4, wherein generating the first address is based on an address range associated with a set of memory devices having favorable performance and capacity attributes.

6. The method of claim 1, wherein identifying the storage unit pool associated with the store data request is based on requester identification.

7. The method of claim 1, wherein identifying the storage unit pool associated with the store data request is based on one or more storage set performance levels.

8. The method of claim 1, wherein the first set of memory devices and the second set of memory devices are located in the same storage units, respectively, of the storage set.

9. The method of claim 1 further comprises:
detecting a second unfavorable storage condition in response to facilitating storage of the data object in the second set of memory devices;
in response to detecting the second unfavorable storage condition, identifying a third set of memory devices of the storage set, the first set of memory devices and the third set of memory devices located, at least in part, in common storage units of the storage set; and
facilitating storage of the data object in the third set of memory devices of the storage set.

10. The method of claim 1, wherein facilitating storage of the data object in the second set of memory devices includes issuing a second set of write slice requests to the second set of memory devices, the second set of write slice requests including the set of encoded data slices produced from the data object.

11. The method of claim 1, the store data request further including at least one of a data object name and a requester identity.

12. A computing device comprises:
a network interface;
a local memory; and
a processing module operably coupled to the network interface and the local memory, wherein the processing module operates to:
receive, via the network interface, a store data request, the store data request including a data object;
identify a storage unit pool associated with the store data request, the storage unit pool including a plurality of storage sets;
identify a first set of memory devices of a storage set of the plurality of storage sets, wherein the storage set includes a plurality of storage units;
issue, via the network interface, a set of write slice requests to the first set of memory devices of the storage set, the set of write slice requests including a set of encoded data slices produced from the data object;
receive an error response to the set of write slice requests, wherein the error response includes an indication that at least one memory device of the first set of memory devices is unavailable for use in storing the data object;
in response to receiving the error response, identify a second set of memory devices of the set of storage units of the storage set, wherein at least one memory device of the first set of memory devices and at least one memory device of the second set of memory devices are located in the same storage unit of the storage set; and
facilitate, via the network interface, storage of the data object in the second set of memory devices.

13. The computing device of claim 12, wherein receiving the error response further includes receiving, from the storage unit pool, less than a write threshold number of favorable write slice responses to the set of write slice requests prior to expiration of a predetermined time frame.

14. The computing device of claim 12, wherein receiving the error response further includes receiving an indication of one or more address ranges of a storage unit that are unavailable for use in storing the data object.

15. The computing device of claim 12, wherein the processing module further operates to:
generate a first address that falls within an address range associated with the first set of memory devices of the storage set, wherein the set of write slice requests is issued in accordance with the first address.

16. The computing device of claim 15, wherein generating the first address is based on an address range associated with a set of memory devices having favorable performance and capacity attributes.

17. The computing device of claim 12, wherein identifying the storage unit pool associated with the store data request is based on at least one of a requester identification, system registry information, a random selection, or available storage capacity of the storage unit pool.

18. The computing device of claim 12, wherein the first set of memory devices and the second set of memory devices are located in the same storage units of the storage set.

19. The computing device of claim 12, wherein the processing module further operates to:
detect a second error response in response to facilitating storage of the data object in the second set of memory devices;
in response to detecting the second error response, identify a third set of memory devices of the storage set, the first set of memory devices and the third set of memory devices located, at least in part, in common storage units of the storage set; and
facilitate storage of the data object in the third set of memory devices of the storage set.

20. The computing device of claim 12, wherein facilitating storage of the data object in the second set of memory devices includes issuing a second set of write slice requests to the second set of memory devices, the second set of write slice requests including the set of encoded data slices produced from the data object.

* * * * *